United States Patent [19]
Long et al.

[11] 3,953,287
[45] Apr. 27, 1976

[54] ASSEMBLY MECHANISM FOR NUCLEAR FUEL BUNDLES

[75] Inventors: John W. Long; Barney S. Flora, both of Richland, Wash.

[73] Assignee: Exxon Nuclear Company, Inc., Bellevue, Wash.

[22] Filed: Aug. 6, 1973

[21] Appl. No.: 386,201

[52] U.S. Cl. ............................................. 176/78
[51] Int. Cl.² ......................................... G21C 3/32
[58] Field of Search ................ 176/29, 30, 66, 67, 176/73, 75, 76, 78, 79, 81

[56] References Cited
UNITED STATES PATENTS 3,741,868  6/1973  Qurnell et al. ..................... 176/78
3,769,158  10/1973  Winders ............................. 176/78

*Primary Examiner*—Stephen C. Bentley
*Attorney, Agent, or Firm*—H. W. Wells; F. Donald Paris

[57] ABSTRACT

In a nuclear power reactor fuel bundle having tie rods fastened to a lower tie plate and passing through openings in the upper tie plate, the assembled bundle is secured by rotatable locking sleeves which engage slots provided in the upper tie plate. Pressure exerted by helical springs mounted around each of the fuel rods urge the upper tie plate against the locking sleeves. The bundle may be disassembled after depressing the upper tie plate and rotating the locking sleeves to the unlocked position.

9 Claims, 8 Drawing Figures

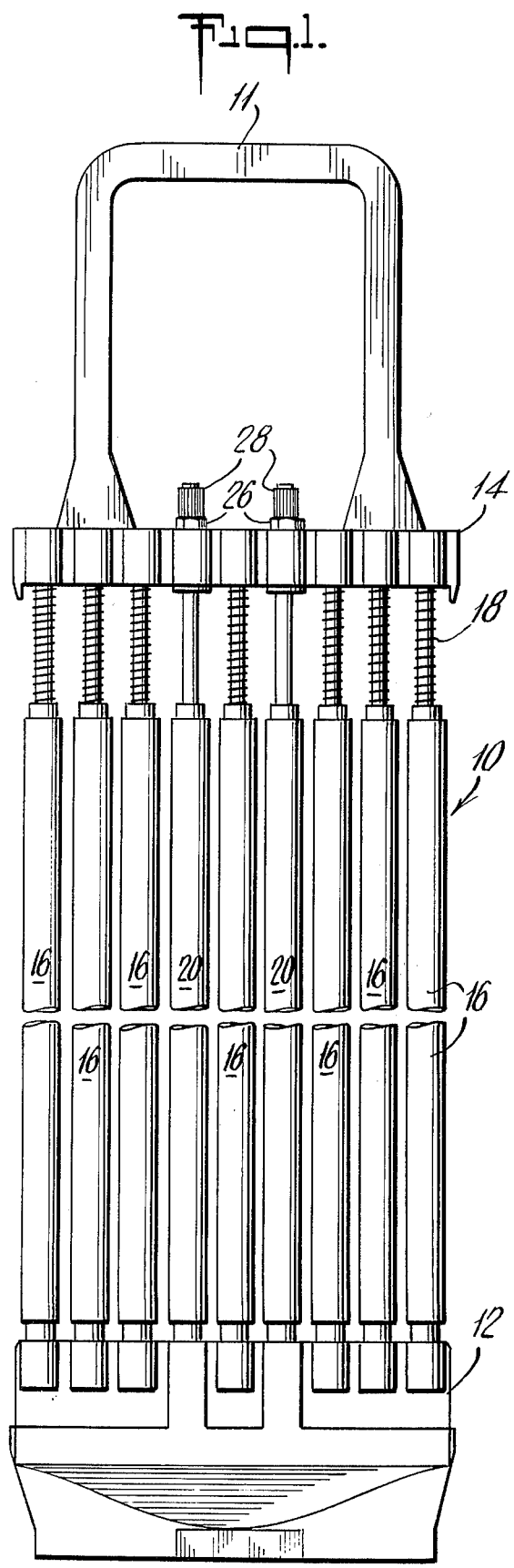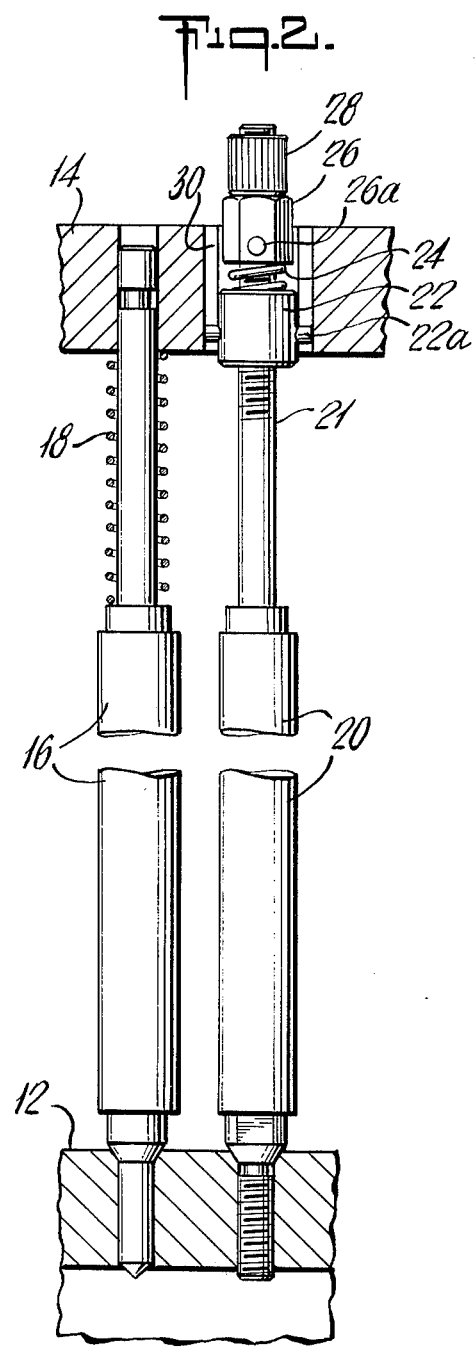

ASSEMBLY MECHANISM FOR NUCLEAR FUEL BUNDLES

BACKGROUND OF THE INVENTION

The present invention relates to nuclear power reactor fuel bundles and, in particular, an improved method and apparatus for assembling of such bundles.

In a typical nuclear power reactor, nuclear fission occurs within so-called "fuel rods" which are assembled in a parallel array into bundles, a multiplicity of which constitute the fuel core of a reactor. Heat from the nuclear fission reaction is taken up by a fluid (usually water) flowing along the outer surface of the rods. As the reactor operates, the fuel is gradually consumed and it is necessary at periodic intervals to replace the fuel. However, only a minor fraction of the fuel bundles are replaced at any one time, in order to avoid large variations in reactor operation. In the event of premature bundle failure or fuel inspection, it is necessary to remove the bundles and to disassemble them for repairs, replacement, or inspection of selected tubes. Thus, the bundles must be readily adapted to disassembly by remote means, since they become highly radioactive during the operation of the reactor. A number of methods have been shown in the prior art for securing nuclear power reactor fuel bundles. See for example U.S. Pat. No. 3,431,170 and copending application Ser. No. 294,213, filed Oct. 2, 1971, now U.S. Pat. No. 3,864,211 and assigned to the same assignee as the present application. Another mode of securing reactor fuel bundles in their assembled conditions is shown in prior copending application Ser. No. 273,161, now abandoned in favor of continuation application U.S. Ser. No. 400,734, filed Sept. 26, 1973 filed July 19, 1972, which is also assigned to the same assignee as the present application.

Many of the prior art devices require the disassembly of relatively small parts which is difficult to do by remote disassembly techniques. Any such locking system should be as simple as possible, not only to reduce the cost of providing the locking system, but also to simplify the need for special tools and complicated procedures for the subsequent disassembly and reassembly under remote control conditions. The possibility of losing such parts during remote disassembly makes it desirable to provide a locking system which need not be disassembled at any time after the initial assembly. The present invention accomplishes the foregoing objectives by providing a novel and simple, inexpensive means of assembling a nuclear reactor fuel bundle.

SUMMARY OF THE INVENTION

In a nuclear power reactor fuel bundle of the type wherein a plurality of fuel rods are mounted in parallel array between two end plates which secure the same and which is assembled by means of a plurality of tie rods secured to both of said end plates, an improved method and apparatus for attaching said tie rods to one of said end plates uses rotatable locking sleeves which engage slots provided in said plate.

Each of the tie rods pass through openings in one of the end plates and extend beyond it. Onto the ends of each of said tie rods are mounted, in order, four principal parts which constitute the features of the present invention: (1) the rod guide, which has a first pair of lugs adapted to fit within a first pair of slots extending completely through the end plate, (2) the position spring, mounted over the tie rod and adjacent the rod guide, (3) the locking sleeve, mounted over the end of the tie rod and against the position spring and having a second pair of lugs which may be aligned with a second pair of slots provided in the end plate at approximately 90° away from the first pair of slots provided for the rod guide. The second set of slots only extends part way through the end plate and, when engaging the second set of lugs, prevents the disassembly of the fuel bundle, and (4) the adjusting nut, which passes over the tie rod end and secures the entire locking assembly.

In order to remove the upper tie plate during the disassembly process, it is only necessary to depress the tie plate against the pressure of the springs surrounding the fuel rods and then to rotate each locking sleeve from its locked position to its unlocked position, whereupon it is possible to remove the tie plate without disassembling the locking assembly. The construction and functioning of the locking assembly will be disclosed more completely in the detailed description which follows.

BRIEF DESCRIPTION OF THE DRAWINGS

FIG. 1 illustrates in an overall elevation view a fuel bundle assembled according to the present invention.

FIG. 2 illustrates an enlarged sectional view of FIG. 1 illustrating both a fuel rod and an assembled tie rod.

DESCRIPTION OF THE PREFERRED EMBODIMENT

Figure 3:
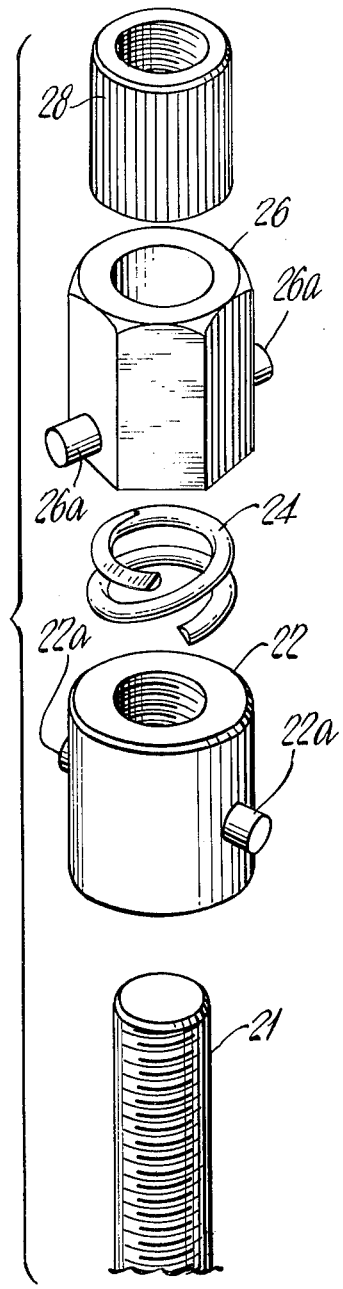
FIG. 3 shows an exploded view of the end of a tie rod and the locking assembly parts.

In FIG. 1 an overall view is shown of an assembled nuclear fuel bundle 10. In parallel array between the lower end plate 12 and the upper end plate 14 are the fuel rods 16 containing the fissionable fuel which is consumed during the reactor operation, creating heat which is transferred to water flowing between the rods 16. The fuel rods 16 are suspended between the end plates 12 and 14 and "float" between them, confined only by holes provided in each of the end plates. Each of the fuel rods 16 has about its upper end a helical spring 18 which provides a force acting against the upper end plate 14 in a direction away from the lower end plate 12. The fuel bundle is held together against the force of the springs by a plurality of tie rods 20 which may be secured in various ways.

The object of the present invention is to secure the tie rods 20 in the upper end plate so that the bundle may be easily disassembled, since after the bundle has become radioactive by operation in a nuclear reactor it can no longer be handled manually. Handle 11, in addition to providing a means for handling the fuel bundle, assists in the handling of the upper end plate 14 during assembly and disassembly of the fuel bundle 10.

In FIG. 2 the lower and upper end plates 12 and 14 are shown in an enlarged sectional view. Fitting snugly within openings provided in the upper and lower end plates the fuel rod 16 is not secured but is free to slide within the openings as the rods expand at the high temperature of the nuclear power reactor. One of the tie rods 20 holding the fuel bundle together is shown in a cutaway view. The lower end of the tie rod 20 is threaded securely into the lower tie plate 12 and normally need not be removed after the initial assembly. If fuel rods 16 are to be removed the upper tie plate 14 is removed, thus the locking of the tie rod 20 to the upper tie plate 14 must be secure but must permit easy disassembly by remotely operated tools. This disassembly is done by remote operation and with the bundle under water since the fuel bundle becomes radioactive after its exposure in the reactor. The four critical parts of the locking assembly of the invention are clearly shown in FIG. 2, namely, the rod guide 22, the position spring 24, the locking sleeve 26 and the adjusting nut 28.

The enlarged exploded view of FIG. 3 shows the four principal components of the locking assembly in their relation to each other as well as to the threaded end of the tie rod 21. In this embodiment, the tie rod guide 22 is threaded onto the tie rod end 21 but, alternatively, it could be made as an integral part of the end of the tie rod. In order to permit proper orientation and axial positioning of the tie rod guide 22, initial adjusting movement of the guide 22 relative to the tie rod end 21 is preferred. In this embodiment, the tie rod guide 22 is tack welded to the tie rod end 21 after proper rod guide positioning. As explained below, tack welding the rod guide 22 to the rod end 21 prevents unintentional rotation of the tie rod which could result in unscrewing the tie rod out of the lower end plate. A first pair of lugs 22a is provided, 180° apart in the preferred embodiment, extending radially outwardly from the side of the rod guide 22. They engage, as will be seen more clearly later, mating slots which are provided through the upper end plate 14. Once the rod guide is in position on the end of the tie rod and is inserted in the opening in the upper end plate, the rod guide and tie rod are free to move longitudinally outward but are restrained from rotation by being within the upper tie plate. Thus, should a tie rod lengthen in service (in addition to normal thermal growth) so that the locking sleeve 26 becomes disengaged the tie rod cannot rotate and become unscrewed from the lower tie plate. Located next outwardly on the tie rod is the helical position spring 24 which is mounted surrounding the tie rod end 21 and abuts both the rod guide 24 and the locking sleeve 26. The position spring 24 forces the locking sleeve 26 away from the rod guide 22 and against the adjusting nut 28. The locking sleeve 26 is mounted next outwardly on the tie rod end but, rather than being threaded thereon, has an opening larger than the tie rod end so that it can move freely, either turning about the tie rod axis or longitudinal to it. The locking sleeve 26 is provided with a second set of lugs 26a which are intended to engage a matching set of recessed slots provided in the outer face of the upper end plate and more completely described later. Next outwardly in the locking assembly is the adjusting nut 28 which is threaded onto the tie rod end and locates the locking sleeve and thereby determines the effective length of the tie rod. When the lugs 26a are fitted into the recessed slots on the end plate, the tie rod will coact with its companion tie rods to secure the assembled fuel bundle.

Figure 5:
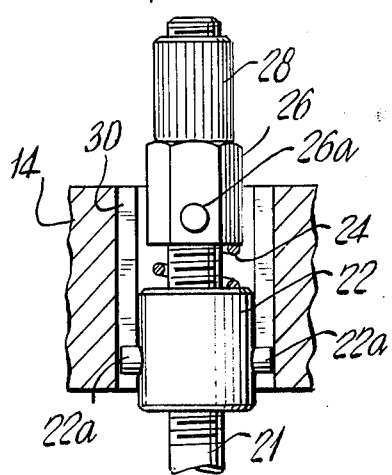
FIG. 5 shows a sectional view of the assembled tie rod taken substantially along line 5—5 of FIG. 4.
Figure 6:
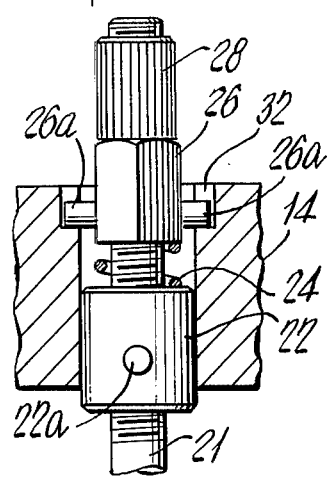
FIG. 6 shows the assembled tie rod taken substantially along line 6—6 of FIG. 4.
Figure 4:
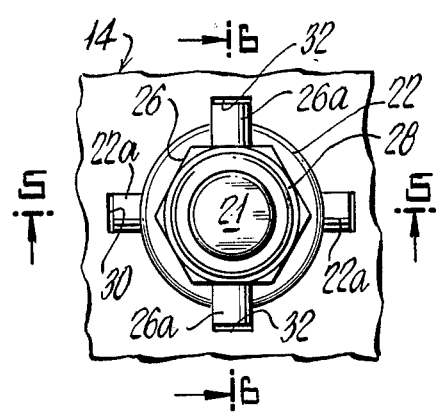
FIG. 4 is a plan view illustrating the assembled tie rod and end plate.

FIG. 4 shows a plan view of an assembled tie rod. Sectional views taken of FIG. 4 and shown as FIGS. 5 and 6 illustrate the locking assembly in its locked position. FIG. 5 shows that the slots 30 which engage the lugs 22a on the rod guide 22 extend completely through the upper end plate 14, thus permitting free movement so that the end plate 14 may be removed. FIG. 6, a view 90° away from FIG. 5, shows that the lugs 26a on the locking sleeve engage relatively shallow recessed slots 32 provided on the outer surface of the upper end plate 14. It should be appreciated that a force is directed against the upper end plate by the helical springs which forces it outwardly toward the adjusting nut 28. This pressure is resisted by the lugs 26a of the locking sleeve 26 which are secured in the recessed slots 32 in the upper end plate 14 and thus prevent the end plate from moving outwardly and freeing the fuel rods from upper end plate.

Figure 7:
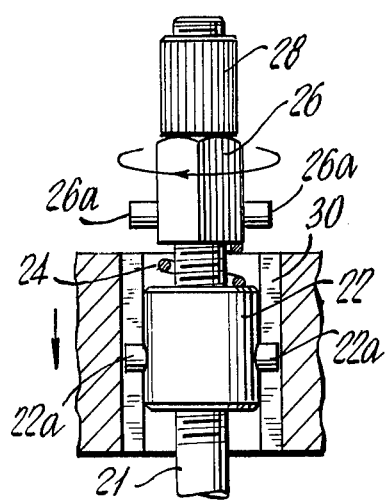
FIG. 7 illustrates the disassembled locking assembly corresponding to the view of FIG. 5.

FIG. 7 illustrates the movement of the locking assembly during disassembly of the fuel bundle. The end plate 14 has been moved in a downward direction against the pressure of the helical springs surrounding the fuel and tie rods, removing the lugs 26a and the locking sleeve 26 from their matching recessed slots 32. Once this has been accomplished, the locking sleeve 26 may be rotated in a 90° direction as shown here, so that the lugs 26a engage the slots 30 which have been provided for the lugs 22a on the rod guide 22. When both pairs of lugs are aligned, the upper end plate 14 may be removed for access to the fuel rods. It should be noted that in this disassembly method the adjusting nut 28 need not be removed and in fact, in a preferred embodiment, it is tack welded in place to keep the locking sleeve 28 in its proper position.

Figure 8:
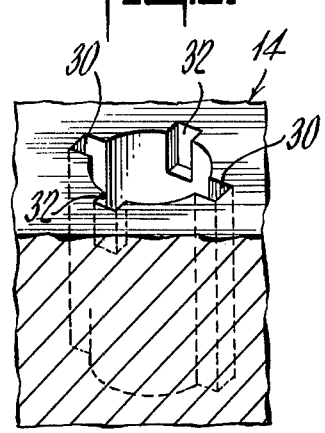
FIG. 8 is a perspective view of the opening in the end plate.

FIG. 8 shows the relative position of the slots 30 which pass completely through the upper end plate and also the shallow recessed slots 32 into which the lugs 26a on the locking sleeve 26 fit during assembly of the fuel bundle to prevent the outward movement of the upper tie plate and thereby to secure the assembled fuel bundle.

The foregoing description of the preferred embodiment is for information only and should not be considered to limit the scope of the invention which is defined by the claims which follow:

What is claimed is:

1. In a nuclear power reactor fuel bundle having a plurality of tie rods for securing a pair of spring-biased fuel rod mounting end plates in assembled position, one end of said tie rods being fixed to one of said end plates and the other end of said rods being mounted for easy disassembly from the second of said end plates, a tie rod locking assembly which comprises:
   a. a first opening extending through the second of said end plates and having at least one radially outward disposed guide slot extending for the length thereof through said second end plate;
   b. tie rod guide means fixed in position at said other end of each of said tie rods for operable engagement with said guide slot and adapted to pass through said first opening;
   c. a second opening recessed into the outer face of said second end plate opposite said fuel rods, said second recessed opening being radially disposed of said first opening and angularly displaced from said guide slot;
   d. locking sleeve means mounted on said other end of each of said tie rods outwardly of said tie rod guide means and moveable about the axis of said tie rod, said locking sleeve provided with projection means adapted to be received within said second recessed opening for preventing the outward movement of said second end plate as urged by said springs.

2. The locking assembly of claim 1 wherein said tie rod guide means comprises a cylindrical member having radial guide projections for mating engagement with said guide slot of said first opening for preventing rotation of the tie rod.

3. The locking assembly of claim 1 wherein said locking sleeve means comprises a cylindrical member having flats to facilitate gripping and an internal axial passageway larger than said tie rod end whereby said sleeve means may move about the axis of said tie rod end and having radially disposed locking projections adapted to engage the corresponding said second openings.

4. The locking assembly of claim 1 including a pair of opposed guide slots and wherein said second opening comprises a pair of opposed shallow recessed slots disposed at substantially 90° relative to said guide slots.

5. The locking assembly of claim 4 wherein said locking sleeve includes a pair of opposed radially projecting lugs for mating engagement with said second recessed openings and said tie rod guide means includes a pair of opposed radially projecting lugs for mating engagement with said guide slots.

6. The locking assembly of claim 1 comprising helical spring means surrounding said other end of each of said tie rods intermediate said tie rod guide means and said locking sleeve means whereby said moveable locking sleeve means is urged away from said fixed tie rod guide means.

7. In a nuclear power reactor fuel bundle having a plurality of tie rods for securing a pair of spring-biased fuel rod mounting end plates in assembled position, one end of said tie rods being fixed to one of said end plates and the other end of said rods being mounted for easy disassembly from the second of said end plates, a tie rod locking assembly which comprises:
  a. a first opening extending through the second of said end plates;
  b. tie rod guide means fixed in position at said other end of each of said tie rods and which is adapted to pass through said first opening;
  c. a second opening recessed into the outer face of said second end plate opposite said fuel rods;
  d. locking sleeve means mounted on said other end of each of said tie rods outwardly of said tie rod guide means and moveable about the axis of said tie rod, said locking sleeve provided with projections adapted to be received within said second opening, thereby preventing the outward movement of said second end plate as urged by said springs; and
  e. a helical spring surrounding said other end of each of said tie rods intermediate said tie rod guide means and said locking sleeve means whereby said moveable locking sleeve means is urged away from said fixed tie rod guide means.

8. The locking assembly of claim 7 further comprising an adjusting nut means located on said other end of each of said tie rods outwardly of said locking sleeve means, thereby providing a limiting stop to axial movement by said locking sleeve means along said tie rod.

9. The locking assembly of claim 8 wherein said adjusting nut is fixed in assembled position to said tie rod, thereby preventing an unintended disassembly while said fuel bundle is in service, but permitting intentional disassembly of the bundle.

* * * * *